US00RE37128E

(19) United States
(12) Reissued Patent
Tomlinson et al.

(10) Patent Number: US RE37,128 E
(45) Date of Reissued Patent: Apr. 10, 2001

(54) STANDING PILOT FURNACE WITH VENTED VESTIBULE

(75) Inventors: Ronald S. Tomlinson, Mount Juliet; Steven W. McKinney, Manchester, both of TN (US)

(73) Assignee: International Comfort Products Corporation (USA), Nashville, TN (US)

(21) Appl. No.: 08/943,996

(22) Filed: Oct. 3, 1997

Related U.S. Patent Documents

Reissue of:
(64) Patent No.: 5,293,860
Issued: Mar. 15, 1994
Appl. No.: 07/940,692
Filed: Sep. 4, 1992

U.S. Applications:

(63) Continuation of application No. 08/389,268, filed on Feb. 17, 1995, now abandoned.

(51) Int. Cl.[7] ..... F24H 3/02

(52) U.S. Cl. ..... 126/110 R; 126/99 A; 126/116 R

(58) Field of Search ..... 126/110 R, 99 A, 126/116 R; 236/16, 15 C, 15 BB, 25 R, 25 A; 431/18, 20, 22, 16

(56) References Cited

U.S. PATENT DOCUMENTS

| | | | | |
|---|---|---|---|---|
| 1,099,876 | * | 6/1914 | Hall | 126/116 B |
| 2,454,296 | * | 11/1948 | Woods | 263/19 |
| 2,499,358 | * | 3/1950 | Cooper | 257/2 |
| 2,504,592 | * | 4/1950 | Scharbau | 158/115 |
| 2,521,866 | * | 9/1950 | Ott | 126/110 |
| 2,769,619 | * | 11/1956 | Juhasz | 257/6 |
| 2,772,730 | * | 12/1956 | Warnecke | 158/115 |
| 3,194,214 | * | 7/1965 | Frendberg | 122/1 |
| 3,542,018 | * | 11/1970 | Quick et al. | 126/116 R |
| 3,667,451 | * | 6/1972 | Boucher | 126/110 |
| 4,401,425 | * | 8/1983 | Gable | 431/22 |
| 4,467,780 | * | 8/1984 | Ripka | 126/116 R X |
| 4,533,315 | * | 8/1985 | Nelson | 431/20 |
| 4,576,226 | * | 3/1986 | Lipets | 165/134 |
| 4,603,681 | * | 8/1986 | Clawson | 126/110 |
| 4,807,588 | * | 2/1989 | Bentley | 126/110 |
| 4,926,840 | * | 5/1990 | Shellenberger et al. | 126/116 R X |
| 4,951,651 | * | 8/1990 | Shellenberger | 126/116 R |
| 4,974,579 | * | 12/1990 | Shellenberger | 126/110 R |
| 5,105,798 | * | 4/1992 | Evens | 126/110 R |

* cited by examiner

*Primary Examiner*—James C. Yeung
(74) *Attorney, Agent, or Firm*—Baker & Daniels

(57) ABSTRACT

An induced draft, fuel-fired furnace having a heat exchanger with an inlet and an outlet includes a vent having an inlet, a burner, and a vented vestibule in fluid communication with the vent. A blower has an inlet in fluid communication with the heat exchanger outlet, and an outlet disposed at the inlet of the vent. The blower outlet has a cross-sectional area smaller than the vent inlet. The vent inlet and blower outlet define a vent inlet opening. A drafthood formed with an inlet is disposed in the vestibule and forms a plenum in fluid communication with the vent inlet opening. A source of combustion products is disposed in the furnace such that combustion products produced thereby are in fluid communication with the drafthood inlet and vent inlet opening. The source of combustion products includes either a standing pilot or electronic ignitor for igniting fuel operably discharged from the burner.

69 Claims, 4 Drawing Sheets

STANDING PILOT FURNACE WITH VENTED VESTIBULE

Matter enclosed in heavy brackets [ ] appears in the original patent but forms no part of this reissue specification; matter printed in italics indicates the additions made by reissue.

*This is a continuation of application Ser. No. 08/389,268 filed Feb. 17, 1995, abandoned.*

BACKGROUND OF THE INVENTION

1. Field of the Invention

The present invention relates to furnaces, and, more particularly, to induced draft, fuel-fired furnaces having a standing pilot.

2. Description of the Related Art

High efficiency fuel-fired furnaces of the type herein concerned include a combustion chamber wherein fuel such as natural or liquified petroleum (LP) gas is burned creating hot gaseous products of combustion, i.e., exhaust gas. A burner having one or more exhaust ports formed therein is connected to a fuel source and burns the fuel which is ignited. The hot exhaust gas is circulated through a heat exchanger which is heated thereby. Air circulates past the heat exchanger and is heated thereby via convection heat transfer. The heated air is circulated through a living space by a circulating blower. In an induced draft furnace, an exhaust blower is located between the heat exchanger and the flue outlet of the furnace and draws the products of combustion through the heat exchanger and discharges them into an exhaust vent.

To ignite the fuel exhausted from the burner, it is known to use either an electronic ignition apparatus or a standing pilot. An electronic ignition apparatus is operably controlled when fuel is exhausted from the burner to ignite the fuel. An electronic ignition system is considerably more costly and complex than a standing pilot. A standing pilot maintains a continuously burning open flame regardless of whether fuel is exhausted from the burner. During periods of inactivity of the burner, therefore, it is necessary to vent the relatively small amount of combustion gas produced by the standing pilot to the flue and ambient environment. A furnace using a standing pilot is less expensive to manufacture than a furnace using an electronic ignition system and may therefore by preferred.

It is known to vent the combustion products produced by a standing pilot through the heat exchanger and into the flue. However, some high efficiency furnaces provide increased heat exchanger efficiency by increasing the pressure drop of the exhaust gas between the inlet and outlet of the heat exchanger. This may be accomplished by providing a longer flow path and/or appropriate sized conduits at various locations within the flow path. This higher pressure drop increases the efficiency of the heat exchanger when exhaust gas is circulated therethrough, thus requiring less heat transfer area for a given output; however, it also prohibits the venting of the standing pilot combustion products through the heat exchanger during periods of inactivity of the burner, i.e., idle flow conditions.

The higher pressure drop therefore further increases internal heat exchanger resistance prohibiting the safe venting of standing pilot combustion products. Thus, a standing pilot may be preferred to reduce manufacturing costs, but may not be safely vented into the heat exchanger and ultimately to the vent.

One method of obtaining the advantages of using a standing pilot while at the same time avoiding the problems of unsafe pilot gas venting mentioned above is to provide a vent tube disposed immediately above the standing pilot. The vent tube is connected to and in fluid communication with the outlet section of a draft inducing fan. Such an apparatus, however, requires relatively precise placement of the vent tube above the standing pilot flame and a specially manufactured or modified blower. Moreover, to prevent back flow of exhaust gas during operation of the blower, a special venturi section forming member must be rigidly fixed at a precise location within the blower adjacent the outlet of the vent tube, thereby further increasing manufacturing costs.

What is needed in the art is an apparatus and method which allows a standing pilot to be used with a high efficiency furnace by easily and inexpensively bypassing the combustion products of the standing pilot directly to the flue of the fuel-fired furnace.

SUMMARY OF THE INVENTION

The present invention provides an opening at the upper end of a vestibule section of a furnace using conventionally available components to allow venting of combustion products from a source of combustion products to the flue. Moreover, a drafthood is provided having openings formed therein for allowing the standing pilot combustion products to flow therethrough to the flue and may include a temperature sensor to detect a blocked flue condition.

The invention comprises, in one form thereof, an induced draft, fuel-fired furnace having a heat exchanger with an inlet and an outlet. A flue inlet defines a first cross-sectional area. A vented vestibule in fluid communication with the flue has disposed therein a burner in fluid communication with the heat exchanger inlet, a standing pilot adapted to ignite fuel operably discharged from the burner, a blower having an inlet in fluid communication with the heat exchanger outlet, and an outlet disposed at the inlet of said flue. The blower outlet defines a second cross-sectional area less than the first cross-sectional area. The portion of the first cross-sectional area not having the second cross-sectional area disposed immediately adjacent thereto defines a vent inlet opening allowing standing pilot combustion products to flow into the flue and ambient environment.

In another form of the invention, a drafthood is disposed in the vestibule and forms a plenum in fluid communication with the vent inlet opening. The drafthood includes an undersurface sealingly engaged with the blower outlet which extends immediately adjacent to a panel of the furnace. The undersurface is formed with an inlet adapted to receive combustion gases from the standing pilot, and a blocked flue detecting means adapted to detect a blocked exhaust gas flow condition in said flue.

An advantage of the present invention is that the combustion gas from the standing pilot is not circulated through the heat exchanger, thereby inhibiting potential associated corrosion of the heat exchanger and providing safe venting of the pilot.

Another advantage is that less expensive materials can be used to form the heat exchanger.

Yet another advantage is that the present invention can provide dual functionality of preventing heat exchanger corrosion and detecting a blocked vent.

Still another advantage is that the components within the vestibule need not be extensively and physically modified to vent the standing pilot to the vent.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
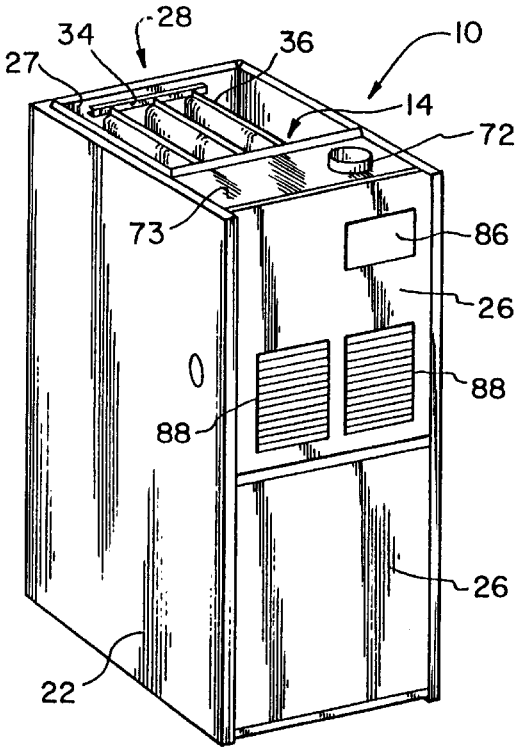
FIG. 1 is a perspective view of the induced draft, fuel-fired furnace of the present invention with the louvered front panel in place.
Figure 3:
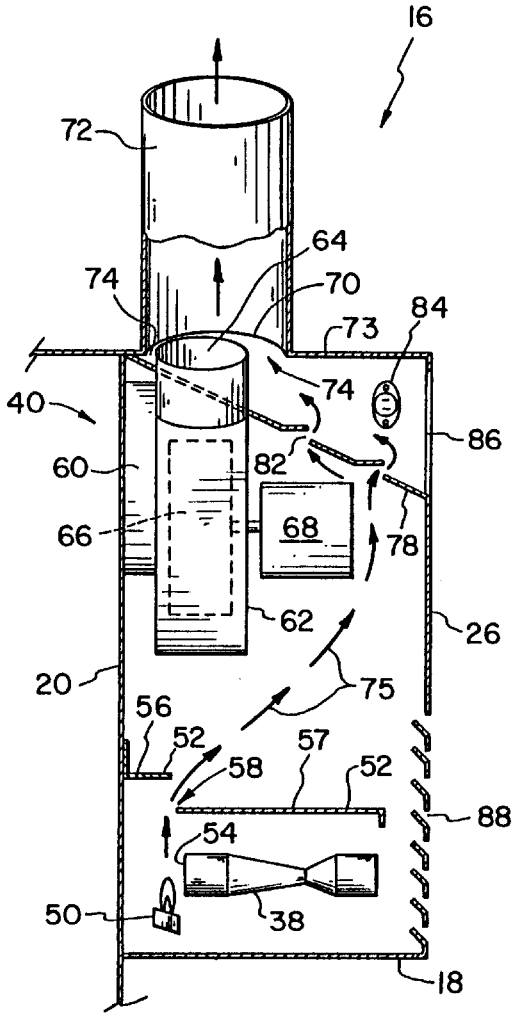
FIG. 3 is a partial side sectional view of the vestibule section shown in FIG. 2 with the upper end of the blower and flue shown in perspective.
Figure 2:
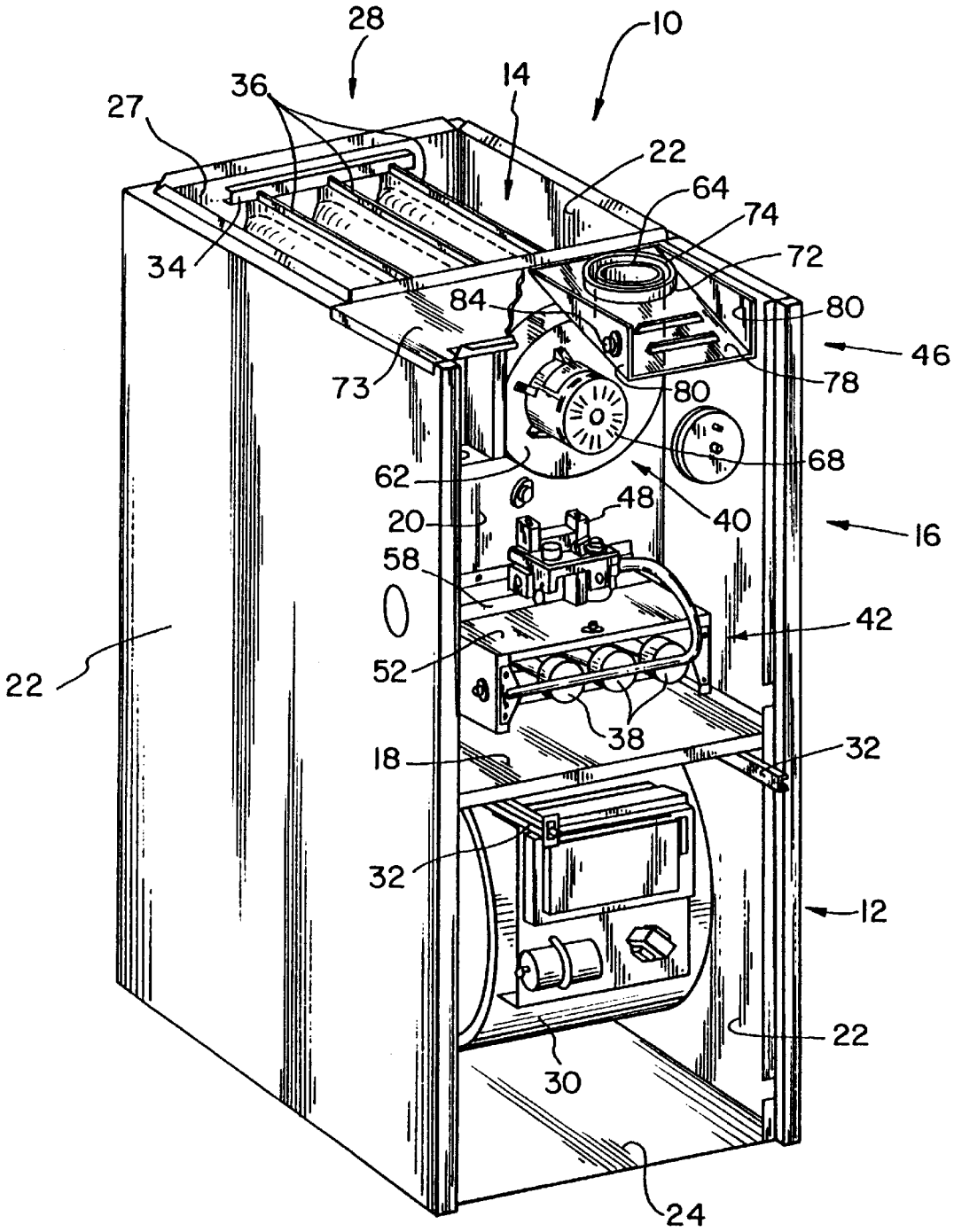
FIG. 2 shows the embodiment of FIG. 1 with the louvered front panel removed.

Referring now to the drawings and particularly to FIGS. 1–3, there is shown an induced draft, fuel-fired furnace of the present invention. Furnace 10 generally includes an air inlet plenum 12, supply air plenum 14 and vestibule 16 separated by a horizontal wall 18 and vertical wall 20.

Air inlet plenum 12 is defined by side walls 22, bottom 24, front panel 26 (FIG. 1), back panel 27 and horizontal wall 18. Air inlet plenum 12 is connected to suitable duct work (not shown) and receives return air therethrough from a space to be heated (not shown). Horizontal wall 18 is formed with an opening therein (not shown) disposed below a heat exchanger generally designated as 28 disposed in supply air plenum 14. A supply blower 30 is suitably fixed within air inlet plenum 12 such that the outlet of supply blower 12 is disposed below the opening formed in the horizontal wall 18. In the embodiment shown, supply blower 30 is a centrifugal blower fixed to an appropriate framework 32 which in turn is fixed to horizontal wall 18. The outlet of centrifugal supply blower 30 exhausts return air through the opening formed in horizontal wall 18 and through heat exchanger 28.

Heat exchanger 28 is disposed within supply air plenum 14 and fixed therein at a desired location with a plurality of mounting brackets, one of which is shown and designated as bracket 34. Heat exchanger 28 is a relatively high pressure drop, high efficiency heat exchanger including three clam shell type heat exchangers 36 formed with a relatively long fluid flow path therethrough. Clam shell type heat exchangers 36 each include an inlet in fluid communication with one of three burners 38 (FIGS. 2 and 3), and an outlet in fluid communication with the inlet of an induced draft blower 40.

In the embodiment shown, heat exchanger 28 is shown as including clam shell type heat exchangers 36. An example of a clam shell type heat exchanger which may be used with the present invention is disclosed in U.S. Pat. No. 4,739,746, which is assigned to the assignee of the present invention and incorporated herein by reference. Moreover, it is also possible and within the scope of this invention to use other type heat exchangers. For example, U.S. Pat. No. 5,094,224, also assigned to the assignee of the present invention and incorporated herein by reference, discloses an enhanced tubular type heat exchanger which may be used with the present invention.

Vestibule 16 (FIGS. 2 and 3) is defined by side walls 22, horizontal wall 18, vertical wall 20, front louvered panel 26 and top member 75. Front panel 26 is provided with a plurality of combustion and ventilation air openings [B6] *86* and vents 88 allowing air flow from the ambient environment into vestibule 16. In the embodiment shown, front panel 26 is formed from two pieces of sheet metal providing respective removable covers for air inlet plenum 12 and vestibule 16. However, front panel 26 may be formed from a single piece of sheet metal providing a removable vertical panel adjacent air inlet plenum 12 and vestibule 16.

Vestibule 16 generally includes therein a burner assembly 42, induced draft blower 40 and drafthood 46. Burner assembly 42 includes a gas valve 48, burners 38, standing pilot 50 and housing 52. Gas valve 48 is of conventional design and operably supplies fuel, e.g., natural or LP gas, to the burners 38 and standing pilot 50. Burners 38, shown schematically in FIG. 3, are in-shot burners fixed within housing 52 having flame producing ends 54, e.g., such as an orificed jet, which respectively extend toward the inlet ends of the clam shell type heat exchangers 36. Burners 38, however, can be formed with other known constructions producing products of combustion which are circulated through heat exchanger 28. For example, U.S. Pat. No. 4,616,994 to Tomlinson, which is assigned to the assignee of the present invention, discloses a gas burner including means for reducing nitrous oxide emissions which may be used with the present invention.

In-shot burners 38 are affixed within housing 52 which in turn is affixed to the vertical wall 20. Housing 52 includes two upper horizontal surfaces 56 and 57 (FIG. 2) which are vertically offset and define an opening 58 allowing combustion gas produced by standing pilot 50 to flow therethrough via natural draft during idle conditions.

Induced draft blower 40 is fixed to vertical wall 20 and includes an inlet 60 in fluid communication with the outlets of clam shell heat exchangers 36. Induced draft blower 40 also includes a housing 62 with an outlet end 64 disposed at the upper end thereof. Disposed within housing 62 is an impeller 66 which is rotatably driven by a motor 68. Outlet end 64 is disposed immediately adjacent to the inlet end 70 of a flue or vent 72 fixed to top member 73. In the embodiment shown, inlet end 70 of flue 72 has a circular cross section with a diameter from 3 to 5 inches, and outlet end 64 of induced draft blower 44 has a circular cross section with a diameter of about 3 inches.

Because the cross-sectional area of the outlet end 64 of induced draft blower 40 is less than the cross-sectional area of the inlet end 70 of flue 72, an area of lower pressure 74 is formed in the space between the periphery of the outlet end 64 and inlet end 70. In the embodiment shown, lower pressure area 74 is defined as a vent inlet opening or venturi section having a generally annular shape. Lower pressure area 74 allows a natural draft within vestibule 16 when induced draft blower 40 is not operating. This fluid flow path is illustrated by the directional arrows indicated generally as 75. Thus, by providing an outlet 64 having a cross-sectional area less than the inlet end 70 of flue 72, the combustion products produced by the standing pilot 50 may be exhausted into the flue 72 and out into the ambient environment.

Although outlet 64 of induced draft blower 44, and inlet end 70 of flue 72 are shown with a generally circular cross-section, it is possible and considered within the scope of this invention to use an outlet 64 and inlet end 20 of different cross-sectional shapes.

Figure 4:
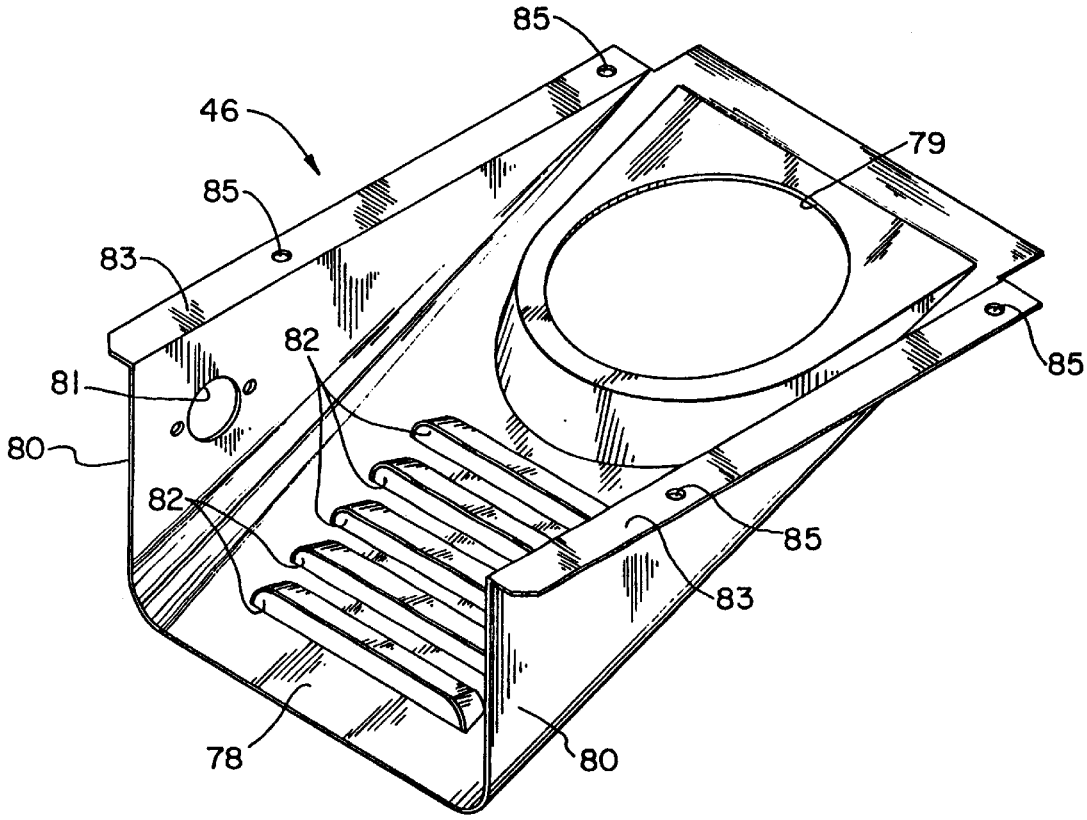
FIG. 4 is a perspective view of the drafthood illustrated in FIGS. 2 and 3.

A drafthood 46 is disposed within vestibule 16 at the upper end thereof (FIGS. 2, 3 and 4). Drafthood 46 includes an under surface 78 with a first opening 79 disposed around and closely adjacent outlet end 64 of induced draft blower 44, and two side members 80 forming a plenum when front panel 26 is in place (FIG. 1). A flange 83 having holes 85 formed therein allows attachment of drafthood 46 to the underside of upper surface 73.

Front panel 26 is formed with an aperture 86 disposed adjacent drafthood 46. Aperture 86 allows ambient air to enter the drafthood 46 and flue 72 and mix with and dilute the exhaust gases therein. Aperture 86 may be a single opening (as shown) or multiple openings (not shown), and the aperture(s) may be louvered.

Formed in the under surface 78 of drafthood 46 is at least one opening 82 (shown schematically in the drawings) allowing combustion gas produced by standing pilot 50 to flow therethrough and into flue 72. In the embodiment shown in FIGS. 2 and 3, two openings 82 are provided in undersurface 78 for allowing natural or induced draft through the vestibule 16. In an alternative embodiment shown in FIG. 4, five openings 82 are provided in undersurface 78 for allowing draft through the vestibule 16. Thus, it is apparent that the exact number of openings 82 formed in undersurface 82 is not critical so long as the combustion products from the standing pilot 50 are allowed to adequately flow therethrough into the drafthood 46.

One of the side members 80 is formed with a second opening 81 adapted to receive a blocked flue sensor means 84 (FIGS. 2 and 3) for detecting a blocked exhaust gas flow condition within flue 72. Sensor means 84 is connected to and operably controls gas valve 48 to prevent fuel flow through gas valve 48 when a blocked vent condition exists, thereby effectively stopping the operation of furnace 10. In the embodiment shown, blocked flue sensor means 84 is a temperature sensor for detecting when hot exhaust gas backflows from the vent into drafthood 46 from vent 72 because of a blocked vent condition. In an alternate embodiment (not shown), it may be possible to limit the size and configuration of openings 82 and aperture 86 and use a pressure sensing means disposed within one of the side members 80 to detect a blocked flue condition.

Figure 5:
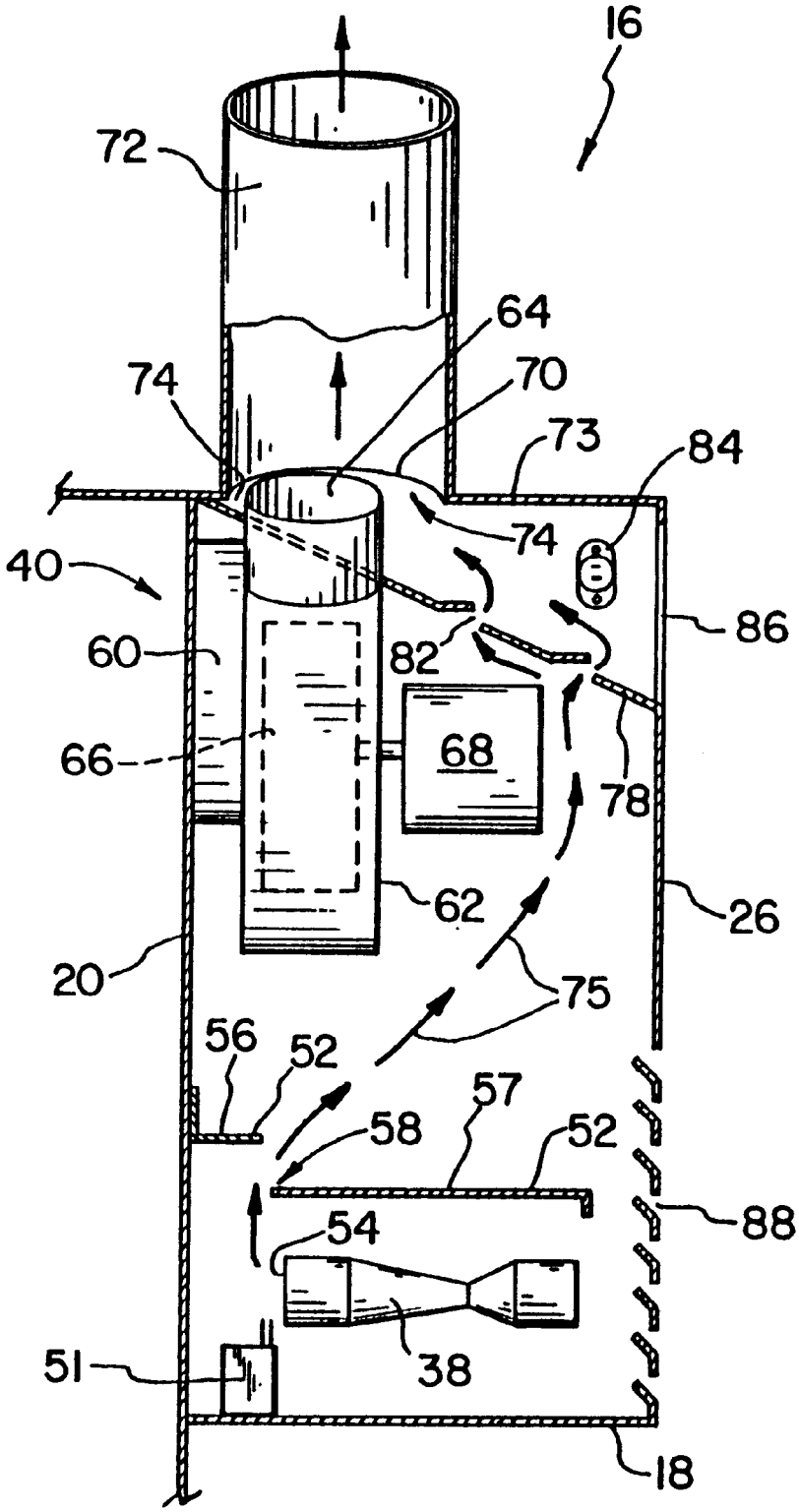
FIG. 5, shows another embodiment of the present invention utilizing an electronic ignition.

FIG. 5 shows another embodiment of the present invention utilizing an electronic ignition 51 discharged from burners. While electronic ignition 51 does not produce products of combustion during idle conditions of burners 38, it may nonetheless be desirable to use the drafthood of the present invention to detect, e.g., a blocked vent condition which might occur. The drafthood is in fluid communication with the vent inlet opening and dilution air opening, and includes an inlet trace or residual combustion products within vented vestibule 16 which may be produced by burners 38.

During an idle condition, a natural draft condition exists in vestibule 16 allowing products of combustion from standing pilot 50 to draft upwards through vestibule 16 and drafthood 46 into flue 72 and the ambient environment. Vents 88 formed in front panel 26 provide oxygen for combustion of fuel exhausted by burners 38 and standing pilot 50, and allow a draft to occur through vestibule 16 such as indicated by directional arrows 75. As combustion products flow upwardly though vestibule 16 and drafthood 46, dilution air flows inwardly from the ambient environment through aperture 86 into drafthood 46 and mixes with and thereby dilutes the standing pilot combustion products. Because induced draft blower 40 is not operating, an area of lower pressure forming a venturi 74 does not exist between the peripheries of outlet 64 and inlet end 70. That is, the area of the induced draft inlet opening between outlet 64 and inlet 70 has a pressure about the same as that existing within vestibule 16, drafthood 46 and flue 72. The products of combustion produced by standing pilot 50 are therefore free to flow upwards via a natural draft through vestibule 16 and into flue 72. The products of combustion of standing pilot 50 are not circulated through heat exchanger 28 during periods of inactivity of burners 38, thereby inhibiting the propensity for causing internal corrosion of heat exchanger 28 and unsafe pilot venting as described above.

During operation, an externally located thermostat (not shown), sends a signal initiating the production of heat from fuel-fired furnace 10. Fuel exhausted from in-shot burners 38 is ignited and drawn through heat exchanger 28 by induced draft blower 40 and exhausted upwardly through flue 72. The exhaust gas flows from outlet 64 of induced draft blower 40 and through inlet end 70 of flue 72, and an area of low pressure forming a venturi section 74 occurs between outlet 64 and inlet 70. Because the pressure existing within venturi section 74 is less than the pressure existing within vestibule 16, vestibule 16 is vented to flue 72 while induced draft blower 40 is operating.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An induced draft, fuel-fired furnace having a heat exchanger with an inlet and an outlet, said furnace comprising:

a vent having an inlet;

a burner;

a vented vestibule in fluid communication with said vent;

a blower having an inlet in fluid communication with the heat exchanger outlet, and an outlet disposed at the inlet of said vent, said blower outlet having a cross-sectional area smaller than said vent inlet, said vent inlet and blower outlet defining a vent inlet opening; and a standing pilot disposed in said furnace such that combustion products produced thereby are in fluid communication with said vent inlet opening, said standing pilot adapted to ignite fuel operably discharged from said burner.

2. The induced draft, fuel-fired furnace of claim 1, further comprising a drafthood disposed in said vestibule and forming a plenum in fluid communication with said vent inlet opening, said drafthood including an undersurface disposed adjacent said blower outlet and extending immediately adjacent to a panel of the furnace, the panel having at least one aperture formed therein, said undersurface formed with an inlet adapted to receive combustion gases from said standing pilot, and a blocked vent detecting means adapted to detect a blocked exhaust gas flow condition in said vent.

3. The furnace of claim 1 wherein said vent inlet opening is adapted to allow a draft condition in said vestibule.

4. The induced draft, fuel-fired furnace of claim 2 further comprising a gas valve operably supplying fuel to said burner and pilot light, said blocked vent detecting means adapted to operably control said gas valve.

5. The induced draft, fuel-fired furnace of claim 4 wherein said blocked vent detecting means is a temperature sensing means adapted to sense hot exhaust gases exhausted into said drafthood when a blocked exhaust gas flow condition exists in said vent.

6. The induced draft, fuel-fired furnace of claim 4 wherein said blocked vent detecting means is a pressure sensing means adapted to sense an increase in pressure caused by hot exhaust gases exhausted into said drafthood when a blocked exhaust gas flow condition exists in said vent.

7. The induced draft, fuel-fired furnace of claim 1 wherein said blower is a centrifugal blower.

8. The induced draft, fuel-fired furnace of claim 1 wherein said burner and standing pilot are disposed near the bottom of said vestibule, and further comprising a horizontal wall disposed above said burner and standing pilot, said horizontal wall formed with an opening allowing combustion gases from said standing pilot to flow therethrough.

9. The induced draft, fuel-fired furnace of claim 1 wherein said burner and standing pilot are disposed near the bottom of said vestibule, and further comprising two offset horizontal walls forming an opening allowing combustion gases from said standing pilot to flow through said opening between said two horizontal walls.

10. The induced draft, fuel-fired furnace of claim 9 wherein one wall of said vestibule is a removable louvered panel, said [louvers] *louvered panel* providing a [vent and] source of ventilation air from the ambient *environment* and allowing updraft through said vestibule and dilution of exhaust gases within said vestibule and vent.

11. The induced draft, fuel-fired furnace of claim 1 wherein said vent inlet and blower outlet each have a generally circular shape, said blower outlet located in or closely adjacent said vent inlet, said vent inlet opening defined by the annular area between the periphery of said vent inlet and blower outlet.

12. The induced draft, fuel-fired furnace comprising:

a heat exchanger having an inlet and an outlet;

a vent including an inlet and a venturi section;

a burner;

a vented vestibule in fluid communication with said vent;

a blower having an inlet in fluid communication with said heat exchanger outlet and an outlet in fluid communication with said vent inlet; and a standing pilot disposed in said furnace such that combustion products provided thereby are in fluid communication with said venturi section, said standing pilot adapted to ignite fuel operably discharged from said burner.

13. The furnace of claim 12 wherein said venturi section is adapted to provide a draft condition in said vestibule.

14. The induced draft, fuel-fired furnace of claim 12, wherein said blower outlet has a generally circular cross-sectional area smaller than and centrally located at said vent inlet, the annular area between the vent inlet and blower outlet defined said venturi section.

15. An induced draft, fuel-fired furnace, comprising:

a heat exchanger having an inlet and an outlet;

a vent having an inlet;

means for providing an area of lower pressure, said providing means defined at least in part by said vent;

a vented vestibule;

a burner disposed within said vestibule and in fluid communication with said heat exchanger inlet and said area of lower pressure;

an induced draft blower having an inlet disposed in fluid communication with said heat exchanger outlet and an outlet disposed in fluid communication with the inlet of said vent; and means for igniting fuel operably discharged from said burner.

16. The furnace of claim 15 *further comprising a standing pilot disposed in said furnace, said vent including a venturi section* wherein said venturi section allows products of combustion from said standing pilot to flow therethrough into said vent and further allows products of combustion exhausted into said vent from said induced draft blower to backflow into said vestibule during a blocked vent condition.

17. The furnace of claim 15 *wherein said vent includes a venturi section, said furnace* further comprising *a standing pilot disposed in said furnace and* a drafthood disposed adjacent said blower outlet and in fluid communication with said venturi section, said drafthood having an undersurface with an opening formed therein for allowing combustion products from said standing pilot to flow therethrough, said drafthood including a temperature sensor to detect hot exhaust gases exhausted into said drafthood during said blocked vent condition.

18. The furnace of claim 17, further comprising a valve operably supplying fuel to said burner and standing pilot, said temperature sensor adapted to operably control said valve and close said valve during a blocked vent condition.

19. The furnace of claim 15 [wherein] *further comprising a standing pilot disposed in said furnace*, said vestibule [is] *being* partially defined by a vertical wall at the outlet of said burner and a housing fixed to said vertical wall which is disposed above said standing pilot and said burner, [said generally horizontal wall forming a] *said* housing adapted to have said valve, burner and *standing* pilot [light] fixed thereto, said *housing including a* generally horizontal wall having an opening formed therein for allowing combustion products produced by said standing pilot to draft upwards therethrough.

20. The furnace of claim 15 [wherein] *further comprising a standing pilot disposed in said furnace,* said vestibule [is] *being* defined in part by a vertical wall disposed at the outlet of said burner and a housing fixed to said vertical wall which is disposed above said standing pilot and said burner, said housing adapted to have said valve, burner and standing pilot fixed thereto, said housing including two generally horizontal members disposed offset to each other and forming an opening therebetween for allowing combustion products produced by said standing pilot to draft upwards therethrough.

21. The induced draft, fuel-fired furnace of claim 15, wherein said igniting means is a standing pilot light.

22. The induced draft, fuel-fired furnace of claim 15, wherein said igniting means is an electronic ignitor.

23. The induced draft, fuel-fired furnace of claim 15, wherein said blower outlet has a cross-sectional area smaller than said vent inlet, said blower outlet and vent inlet defining said area of lower pressure.

24. An induced draft, fuel-fired furnace, comprising:

a vent having an inlet;

a vented vestibule disposed in fluid communication with said vent, said vestibule comprising a plurality of panels;

a blower having an inlet in fluid communication with [the heat exchanger outlet] *said vestibule*, and an outlet disposed at the inlet of said vent;

a drafthood disposed in said vestibule, said drafthood forming a plenum in fluid communication with said vent [and including an inlet], said drafthood in fluid communication with an aperture formed in one of said vented vestibule panels, said drafthood including an undersurface formed with an inlet, and a blocked [vented] *vent* detecting means adapted to detect a blocked exhaust gas flow condition in said vent;

a burner disposed in said furnace and in fluid communication with said drafthood inlet; and means for igniting fuel operably discharged from said burner.

25. The induced draft, fuel-fired furnace of claim 24 wherein said igniting means is a standing pilot light.

26. The induced draft, fuel-fired furnace of claim 24 wherein said igniting means is an electronic ignitor.

*27. An induced draft, fuel-fired furnace, comprising:*

*a heat exchanger having an inlet and an outlet;*

*a vent including an inlet and a venturi section;*

*a burner;*

*ignition means for igniting fuel operatively discharged from said burner;*

*a blower having an inlet in fluid communication with said heat exchanger outlet and an outlet in fluid communication with said vent inlet; and*

*drafthood means separating said ignition means from said vent, said drafthood means having a plurality of openings to allow fluid communication between said ignition means and said venturi section.*

*28. The induced draft, fuel-fired furnace of claim 27 further comprising a removable louvered panel adjacent said drafthood means, said louvered panel providing a source of ventilation air from the ambient environment and allowing updraft and dilution of exhaust gases within said vent.*

*29. The induced draft, fuel-fired furnace of claim 27 wherein said venturi section is adapted to allow a draft condition in said furnace.*

*30. The induced draft, fuel-fired furnace of claim 27 wherein said drafthood means is disposed in a vestibule of said furnace and forms a plenum in fluid communication with said vent inlet opening, and said drafthood means includes an undersurface disposed adjacent said blower outlet and extending immediately adjacent to a panel of the furnace.*

*31. The induced draft, fuel-fired furnace of claim 30 wherein said panel has at least one aperture, and said furnace further includes blocked vent detecting means adapted to detect a blocked exhaust gas flow condition in said vent.*

*32. The induced draft, fuel-fired furnace of claim 31 wherein said blocked vent detecting means includes a temperature sensing means adapted to sense hot exhaust gases exhausted into said drafthood means when a blocked exhaust gas flow condition exists in said vent.*

*33. The induced draft, fuel-fired furnace of claim 31 wherein said blocked vent detecting means is a pressure sensing means adapted to sense an increase in pressure caused by hot exhaust gases exhausted into said drafthood means when a blocked exhaust gas flow condition exists in said vent.*

*34. An induced draft, fuel-fired furnace comprising:*

*a heat exchanger having an inlet and an outlet;*

*a vent including an inlet and a venturi section;*

*a burner;*

*a blower having an inlet in fluid communication with said heat exchanger outlet and an outlet in fluid communication with said vent inlet; and*

*a drafthood in fluid communication with said vent, said drafthood disposed in a vestibule of said furnace and forming a plenum in fluid communication with said vent inlet opening, said drafthood including an undersurface disposed adjacent said blower outlet and extending immediately adjacent to a panel of the furnace.*

*35. The induced draft, fuel-fired furnace of claim 34 wherein the panel has at least one aperture, and said furnace further includes blocked vent detecting means adapted to detect a blocked exhaust gas flow condition in said vent.*

*36. The induced draft, fuel-fired furnace of claim 35 wherein said blocked vent detecting means includes a temperature sensing means adapted to sense hot exhaust gases exhausted into said drafthood when a blocked exhaust gas flow condition exists in said vent.*

*37. The induced draft, fuel-fired furnace of claim 35 wherein said blocked vent detecting means is a pressure sensing means adapted to sense an increase in pressure caused by hot exhaust gases exhausted into said drafthood when a blocked exhaust gas flow condition exists in said vent.*

*38. The induced draft, fuel-fired furnace of claim 34 wherein said panel is a removable louvered panel adjacent said drafthood, said louvered panel providing a source of ventilation air from the ambient environment and allowing updraft and dilution of exhaust gases within said vent.*

*39. The induced draft, fuel-fired furnace of claim 34 wherein said venturi section is adapted to allow a draft condition in said furnace.*

*40. An induced draft, fuel-fired furnace, comprising:*

*a heat exchanger having an inlet and an outlet;*

*a vent having an inlet;*

*low pressure means for providing an area of lower pressure, said low pressure means defined at least in part by said vent;*

*a burner disposed within a vestibule and in fluid communication with said heat exchanger inlet and said area of lower pressure;*

*ignition means for igniting fuel operatively discharged from said burner, said means disposed in said vestibule;*

*an induced draft blower having an inlet disposed in fluid communication with said heat exchanger outlet and an outlet disposed in fluid communication with the inlet of said vent; and*

*drafthood means disposed in said vestibule and separating said ignition means from said vent, said drafthood means having a plurality of openings to allow fluid communication between said ignition means and said low pressure means.*

*41. The induced draft, fuel-fired furnace of claim 40 further comprising a removable louvered panel adjacent said drafthood means, said louvered panel providing a source of ventilation air from the ambient environment and allowing updraft and dilution of exhaust gases within said vent.*

*42. The induced draft, fuel-fired furnace of claim 40 wherein said low pressure means is adapted to allow a draft condition in said furnace.*

*43. The induced draft, fuel-fired furnace of claim 40 wherein said drafthood means is disposed in a vestibule of said furnace and forms a plenum in fluid communication with said vent inlet opening, and said drafthood means*

*includes an undersurface disposed adjacent said blower outlet and extending immediately adjacent to a panel of the furnace.*

*44. The induced draft, fuel-fired furnace of claim 43 wherein said panel has at least one aperture, and said furnace further includes blocked vent detecting means adapted to detect a blocked exhaust gas flow condition in said vent.*

*45. The induced draft, fuel-fired furnace of claim 44 wherein said blocked vent detecting means includes a temperature sensing means adapted to sense hot exhaust gases exhausted into said drafthood means when a blocked exhaust gas flow condition exists in said vent.*

*46. The induced draft, fuel-fired furnace of claim 44 wherein said blocked vent detecting means is a pressure sensing means adapted to sense an increase in pressure caused by hot exhaust gases exhausted into said drafthood means when a blocked exhaust gas flow condition exists in said vent.*

*47. An induced draft, fuel-fired furnace comprising:*

*a heat exchanger having an inlet and an outlet;*

*a vent having an inlet;*

*low pressure means for providing an area of lower pressure, said low pressure means defined at least in part by said vent;*

*a burner disposed within a vestibule and in fluid communication with said heat exchanger inlet and said area of lower pressure;*

*an induced draft blower having an inlet disposed in fluid communication with said heat exchanger outlet and an outlet disposed in fluid communication with the inlet of said vent; and*

*a drafthood in fluid communication with said vent, said drafthood including an undersurface disposed adjacent said blower outlet and extending immediately adjacent to a panel of the vestibule.*

*48. The induced draft, fuel-fired furnace of claim 47 wherein the panel has at least one aperture, and said furnace further includes blocked vent detecting means adapted to detect a blocked exhaust gas flow condition in said vent.*

*49. The induced draft, fuel-fired furnace of claim 48 wherein said blocked vent detecting means includes a temperature sensing means adapted to sense hot exhaust gases exhausted into said drafthood when a blocked exhaust gas flow condition exists in said vent.*

*50. The induced draft, fuel-fired furnace of claim 48 wherein said blocked vent detecting means is a pressure sensing means adapted to sense an increase in pressure caused by hot exhaust gases exhausted into said drafthood when a blocked exhaust gas flow condition exists in said vent.*

*51. The induced draft, fuel-fired furnace of claim 47 wherein said panel is a removable louvered panel adjacent said drafthood, said louvered panel providing a source of ventilation air from the ambient environment and allowing updraft and dilution of exhaust gases within said vent.*

*52. The induced draft, fuel-fired furnace of claim 47 wherein said venturi section is adapted to allow a draft condition in said furnace.*

*53. An induced draft, fuel-fired furnace, comprising:*

*a vent having an inlet;*

*a vented vestibule disposed in fluid communication with said vent, said vestibule comprising a plurality of panels;*

*a blower having an inlet in fluid communication with said vestibule, and an outlet disposed at the inlet of said vent;*

*a drafthood disposed in said vestibule, said drafthood forming a plenum in fluid communication with said vent, said drafthood in fluid communication with an aperture formed in one of said vented vestibule panels, said drafthood including an undersurface formed with an inlet;*

*a burner disposed in said furnace and in fluid communication with said drafthood inlet; and*

*igniting means for igniting fuel operably discharged from said burner.*

*54. The induced draft, fuel-fired furnace of claim 53 further comprising a removable louvered panel adjacent said drafthood, said louvered panel providing a source of ventilation air from the ambient environment and allowing updraft and dilution of exhaust gases within said vent.*

*55. The induced draft, fuel-fired furnace of claim 53 wherein said vent includes a venturi section adapted to allow a draft condition in said furnace.*

*56. The induced draft, fuel-fired furnace of claim 53 wherein said igniting means includes a standing pilot light.*

*57. The induced draft, fuel-fired furnace of claim 53 wherein said igniting means includes an electronic ignitor.*

*58. An induced draft, fuel-fired furnace, comprising:*

*a vent having an inlet;*

*a vented vestibule disposed in fluid communication with said vent, said vestibule comprising a plurality of panels;*

*a blower having an inlet in fluid communication with said vestibule, and an outlet disposed at the inlet of said vent;*

*a drafthood disposed in said vestibule, said drafthood forming a plenum in fluid communication with said vent, said drafthood in fluid communication with an aperture formed in one of said vestibule panels, said drafthood including an undersurface formed with an inlet;*

*a burner disposed in said furnace and in fluid communication with said drafthood inlet;*

*igniting means for igniting fuel operatively discharged from said burner; and*

*blocked vent detecting means adapted to detect a blocked exhaust gas flow condition in said vent, said blocked vent detecting means including a temperature sensing means adapted to sense hot exhaust gases exhausted into said drafthood when a blocked exhaust gas flow condition exists in said vent.*

*59. The induced draft, fuel-fired furnace of claim 58 wherein said blocked vent detecting means includes pressure sensing means adapted to sense an increase in pressure caused by hot exhaust gases exhausted into said drafthood when a blocked exhaust gas flow condition exists in said vent.*

*60. The induced draft, fuel-fired furnace of claim 58 further comprising a removable louvered panel adjacent said drafthood, said louvered panel providing a source of ventilation air from the ambient environment and allowing updraft and dilution of exhaust gases within said vent.*

*61. The induced draft, fuel-fired furnace of claim 58 wherein said vent includes a venturi section adapted to allow a draft condition in said furnace.*

*62. The induced draft, fuel-fired furnace of claim 58 wherein said igniting means includes a standing pilot light.*

*63. The induced draft, fuel-fired furnace of claim 58 wherein said igniting means includes an electronic ignitor.*

*64. An induced draft, fuel-fired furnace, comprising:*

*a heat exchanger having an inlet and an outlet;*

*a flue including an inlet and a venturi section;*

*a burner;*

*igniting means for igniting fuel operatively discharged from said burner, said igniting means producing combustion gases;*

*a blower having an inlet in fluid communication with said heat exchanger outlet and an outlet in fluid communication with said flue inlet, said blower having an operational mode and a non-operational mode;*

*a vent adjacent said igniting means, said vent providing a source of ventilation air; and*

*drafthood means positioned within said furnace and including a plurality of apertures to allow communication of said ventilation air from said vent to said flue and to create an updraft which draws said igniting means combustion gases from said igniting means through said drafthood apertures, into said venturi section, and to the outside environment through said flue during said non-operational mode of said blower.*

*65. The induced draft, fuel-fired furnace of claim 64, further including a second vent adjacent said flue inlet, said second vent providing a source of dilution air and creating an updraft which draws ambient air through said second vent and into said venturi section to mix with, and dilute, said combustion gases exiting from said heat exchanger outlet during said operational mode of said blower.*

*66. The induced draft, fuel-fired furnace of claim 64 wherein said furnace further includes blocked flue detecting means adapted to detect a blocked exhaust gas flow condition in said flue.*

*67. The induced draft, fuel-fired furnace of claim 66 wherein said blocked flue detecting means includes a temperature sensing means adapted to sense hot exhaust gases exhausted into said drafthood means when a blocked exhaust gas flow condition exists in said flue.*

*68. The induced draft, fuel-fired furnace of claim 66 wherein said blocked flue detecting means is a pressure sensing means adapted to sense an increase in pressure caused by hot exhaust gases exhausted into said drafthood means when a blocked exhaust gas flow condition exists in said flue.*

*69. The induced draft, fuel-fired furnace of claim 64 wherein said igniting means includes a standing pilot light.*

* * * * *